(12) United States Patent
Seal

(10) Patent No.: US 9,050,545 B1
(45) Date of Patent: Jun. 9, 2015

(54) SYSTEMS AND METHODS FOR RECOVERY OF METALS AND COMPONENTS

(75) Inventor: Thomas Joseph Seal, Spring Creek, NV (US)

(73) Assignee: DIFFERENTIAL ENGINEERING INC., Spring Creek, NV (US)

(*) Notice: Subject to any disclaimer, the term of this patent is extended or adjusted under 35 U.S.C. 154(b) by 532 days.

(21) Appl. No.: 13/460,529

(22) Filed: Apr. 30, 2012

Related U.S. Application Data

(60) Provisional application No. 61/479,850, filed on Apr. 28, 2011.

(51) Int. Cl.
*C22B 3/02* (2006.01)
*B01D 11/02* (2006.01)
*B01F 1/00* (2006.01)
*E21B 43/28* (2006.01)

(52) U.S. Cl.
CPC .. *B01D 11/02* (2013.01); *B01F 1/00* (2013.01)

(58) Field of Classification Search
CPC ............. C22B 3/02; B01D 11/02; B01F 1/00; E21B 43/28
USPC ........................ 266/101, 89, 81, 83, 80; 299/5
See application file for complete search history.

(56) References Cited

U.S. PATENT DOCUMENTS 4,589,488 A * 5/1986 Schirmer ...................... 166/257
8,021,461 B2 9/2011 Seal

* cited by examiner

*Primary Examiner* — George Wyszomierski
*Assistant Examiner* — Tima M McGuthry Banks
(74) *Attorney, Agent, or Firm* — Baker & Hostetler LLP

(57) ABSTRACT

In embodiments, an aqueous solution containing lixiviants and/or other chemicals and/or reagents may be delivered into the well through one or more conduits or pipes. The chemicals in the aqueous solution may further be mixed together and/or with other ingredients. The solution may thereafter be screened and delivered by being pumped to pressures required for delivery of the solution from a perforated well, deep into a heap leach pad to leach, re-leach, and/or rinse extracted components of interest, such as metals for recovery. The delivery method may open or stimulate new fluid pathways or channels by lifting and mobilizing materials in the heap, thereby creating new channels, and allowing fluid to travel substantially horizontally through the heap to interface with inventory metal for recovery. The system may include a mobile platform assembled near or at the vicinity of the injection well.

30 Claims, 7 Drawing Sheets

SYSTEMS AND METHODS FOR RECOVERY OF METALS AND COMPONENTS

CROSS-REFERENCES TO RELATED APPLICATIONS

This application takes priority from U.S. Provisional Patent Application No. 61/479,850, filed 28 Apr. 2011, which is incorporated by reference.

BRIEF DESCRIPTION

Embodiments relate to systems and methods for heap leaching of materials, and more particularly, to remedial treatment of heaps to improve heap leach extraction. Embodiments include improvements to U.S. Pat. No. 8,021,461, which is incorporated herein by reference, which names the same inventor as the present application. In embodiments, wells with perforated well casing are installed into the heap to be leached. Each designed perforation of the well casing is called a zone that during stimulation (pumping) impacts a geometric volume of the heap pile, depending on the pump pressure, volume and location of the zone isolation mechanism.

In embodiments, an aqueous solution containing lixiviants and/or other chemicals and/or reagents may be delivered into the well through one or more conduits or pipes. The chemicals in the aqueous solution may further be mixed together and/or with other ingredients. The solution may thereafter be screened and delivered, for example by being pumped to pressures required for delivery of the solution from a perforated well, deep into a heap leach pad to leach, re-leach, alter the chemistry, and/or rinse extracted components of interest, such as metals for recovery. The delivery method may open or stimulate new fluid pathways or channels by moving the ore particles in the heap, thereby creating new channels, and allowing fluid to interface with inventory metal for recovery. The process does not use hydraulic fracturing of the material, but relies upon pressurized fluid rechanneling through the stacked material. The system may include a mobile apparatus (e.g. a mobile trailer) assembled near or at the vicinity of the injection well.

The trailer apparatus may comprise instruments configured to perform a number of functions including, but not limited to, measurement of flow and pressure of the aqueous solution and other fluids. The trailer may further comprise a high pressure, low volume compressor to inflate a straddle zone isolation mechanism to isolate a specific elevation in the heap for selective stimulation, leaching, rinsing and/or recovery of metals from ore in a heap. Embodiments enable any one or more of higher flow rates, higher pressure, and delivery to increased depths, while maintaining and/or enhancing safer operations. Pressurization of the straddle zone isolation mechanism may be achieved without the use of pressurized nitrogen bottles.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND

A common technique for extracting metal from ores and other mineral material is to heap leach the material. An engineered pile of fragmented, un-consolidated rock, or heap, of particulate material is constructed, typically over an engineered liner and liquid collection system. A leach solution is applied to and percolated through the heap to contact the material and dissolve one or more metal of interest into the leach solution. Sprinklers are occasionally used for irrigation of the heap, but drip irrigation is more commonly used to minimize evaporation and more uniformly distribute the leaching solution. The solution, called a "barren solution", containing metal dissolving lixiviants, percolates through the heap and leaches the target mineral or substance as well as other materials. This process, called the "leach cycle" can take between a couple of days to months or years depending on the material being leached.

Theoretically, the barren solution is supposed to travel vertically through the heap in a fairly uniform manner from the starting point of each drip point. In reality, within a relatively short period of time, a path of least resistance will be formed in the heap starting at each drip point that is based on the formation or placement of the material underneath the drip point. Each path of least resistance is unlikely to be vertical and as a result, large sections of the heap may receive no barren solution after a period of time, resulting in relatively little or no leaching of the target material. In addition, the leach solution may not uniformly contact all portions of the heap because of permeability variations that exist within the heap. Such permeability variations may result in preferential flow of leach solution through higher permeability portions of the heap, leaving lower permeability portions under-leached or un-leached. Also, the chemical properties in some portions of the heap may be less conducive to dissolution of the metal into the leach solution. For example, when heap leaching gold with a cyanide leach solution under alkaline conditions, low pH spots within the heap may not respond well to the alkaline leach solution, leaving those portions under-leached or un-leached. Metals remaining in under-leached and un-leached portions of a heap following heap leach operations often represent a significant loss to a mining operation.

A collection system collects the resulting pregnant leach solution drained from the liner, which is then processed to recover the dissolved metal. Once the target material has been removed from the pregnant solution, the once again barren solution, with additional lixiviants added, can then be reused in the heap leach process or treated further to remove certain toxic chemicals.

As noted, a common problem with heap leaching is the non-uniform leaching of metals from the heap. Even after extensive leaching over time, some portions of the heap may remain under-leached or even substantially un-leached. U.S. Pat. No. 8,021,461 describes a method for addressing non-uniform leaching in a heap that involves geophysically surveying the heap to identify portions of the heap that require further extraction, hydraulically fracturing the identified portions, and then treating the identified portions.

BRIEF DESCRIPTION OF THE SEVERAL VIEWS OF THE DRAWING

Non-limiting and non-exhaustive examples will be described with reference to the following figures, wherein like reference numerals refer to like parts throughout the various figures.

FIG. 6A is an illustration of a slotted plate for insertion into the well top section of FIG. 6.

DETAILED DESCRIPTION

Although the terms "heap" and "heap leach" are used herein to illustrate an application of the systems and methods described herein, embodiments are not limited to use with heaps and for heap leaching. The systems and methods herein may also be used for percolation leaching, dump leaching, crushed leaching, ore pile leaching, run of mine leaching and other leaching methods where ore or material is placed on or over an engineered liner with a collection system, which are collectively referred to herein as a "collection", regardless of the design of heap, pile, collection system pipe work, ditches, ponds, liner, drain rock or whether such collections include ore or other materials.

Figure 1:
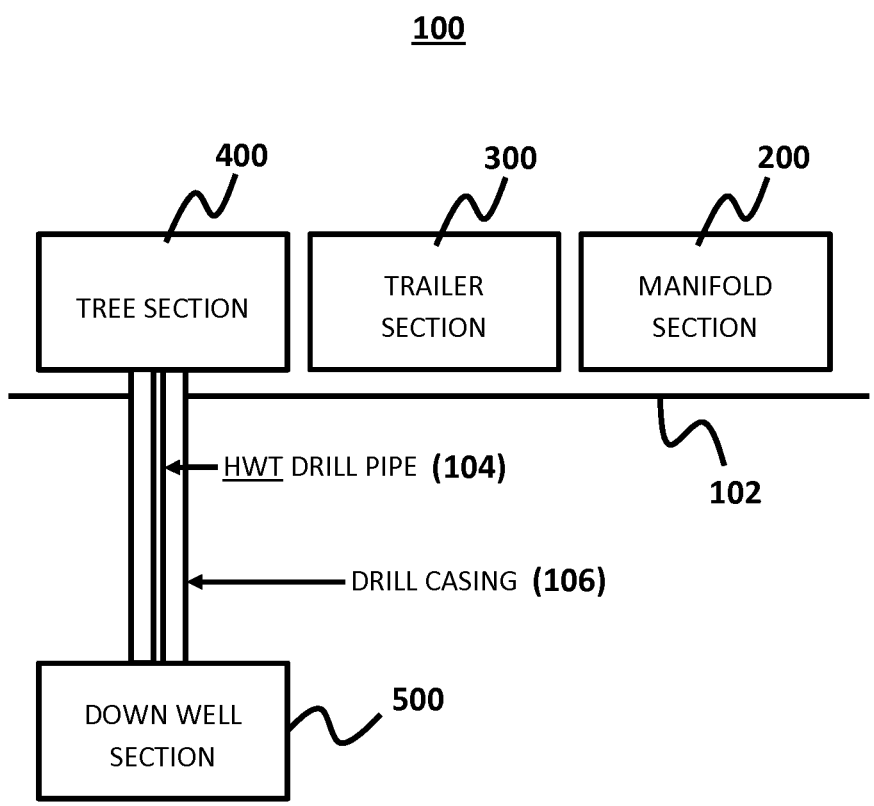
FIG. 1 is a block diagram of an embodiment of an exemplary system for recovering metals and components form a heap leach.

Referring to FIG. 1, an embodiment of a system 100 and accompanying method for heap leaching and for recovering one or more components of interest from a heap 102 is illustrated. As shown in FIG. 1, an exemplary system may include five main sections: a manifold section 200, a trailer section 300, a tree section 400 and a down well section 500. While the trailer section 300 is referred to herein as a trailer section, it is to be understood that any type of mobile platform could be used in place of the flatbed style of trailer illustrated herein. The tree section may be connected to the down well section by HWT drill pipe 104 (a known type of drill pipe that is larger in diameter than other types of drill pipes previously used) and drill casing 106, as is known in the art and further described herein. While each of these sections will be described in greater detail, each section may not be described in this precise order.

Figure 2:
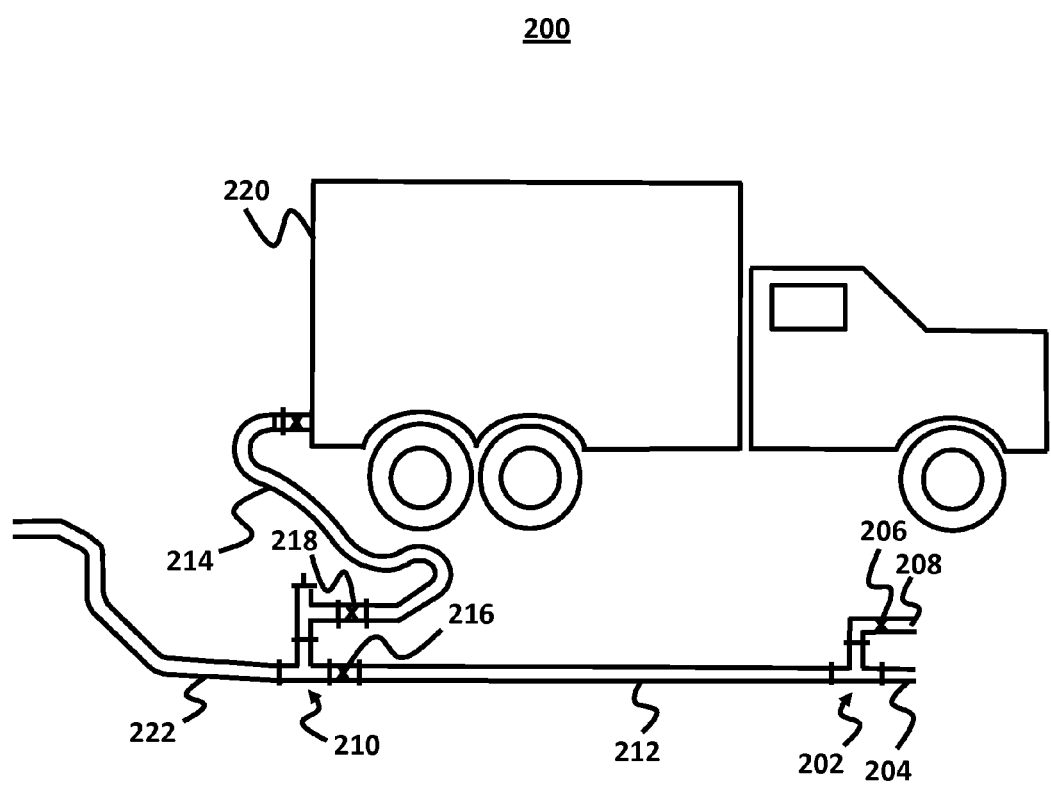
FIG. 2 is an illustration of the manifold section of FIG. 1.

Referring now to FIG. 2, the manifold section will be described in greater detail. The manifold itself may be a nest of pipes, conduits, fittings, couplers, valves, and flanges. The manifold is configured to regulate barren solution and enable regulation and mixing of chemicals and reagents, both liquid and solids in a slurry, that will make up the treatment solution to be pumped into a collection containing ores and other minerals so as to enhance the leaching of target materials from the pile. The manifold is designed for ease of assembly and disassembly so it can be readily moved to different portions of a collection or to other collections.

A first end 202 of the manifold section 200 may connect to one or more pipes 204 for delivery of a pumpable solution that may include gases, chemicals, reagents, solids and pulp, lixiviants and the like, separately or in combination, referred to herein as a "barren" solution when not mixed with other additional chemicals for well stimulation (pumping) and a "treatment" solution when mixed with chemicals, gases, air, etc. The first end 202 of the manifold section 200 may be configured to regulate solution flow and allow other solutions and/or slurries to be mixed with the barren solution by way of valves, such as first valve 206, and attached hoses or pipes 208 to deliver other reagents and chemicals for treatment.

A second end 210 may also be configured to control the flow and mixing of reagents to the downstream apparatus or system. The second end 210 may connect the barren pipe line 212 with a flexible hose 214 and may have several ports with valves to accommodate solution flows. For example, second value 216 may be used to regulate the flow of barren solution coming into the second end 210 through barren line 212 and third value 218 may be used to regulate the flow of addition reagents through flexible hose 214. The diameter of the nest of pipes, ports, valves and other components of the manifold section 200 may be sufficiently large so as to support the volume of barren/treatment fluid to be pumped into the well, as further described below. In regulating the flow of barren solution and the flow of chemicals (reagents, cyanide, etc.), the ports may also be fitted with valves that are configured to control mixing and mixtures of reagents and fitting adapters to hoses and reagent pipes. The manifold section 200 may be configured to enable the addition of reagents, including, but not limited to high temperature reagents, to the barren/treatment solution where mixing and cooling occurs.

Embodiments including different manifold designs that may enable the mixing and/or faster cooling of hot reagents when offloading from chemical/reagent tanks or tankers, such as vehicle 220 illustrated in FIG. 2. A first flexible hose 214 and second end 210 may enable vehicle 220 to be used to deliver reagents or other optional chemicals to the manifold regardless of where the manifold may be located on a collection and may also be used to facilitate off-loading. The length of first flexible hose 214 may be determined by the distance of the vehicle 220 from the second end 210 of the manifold section 200, and the diameter of first flexible hose 214 may be determined by the desired fluid flow. This flexible arrangement may enhance assembly and disassembly of the system 100 and the overall operation of the leaching process.

Figure 3:
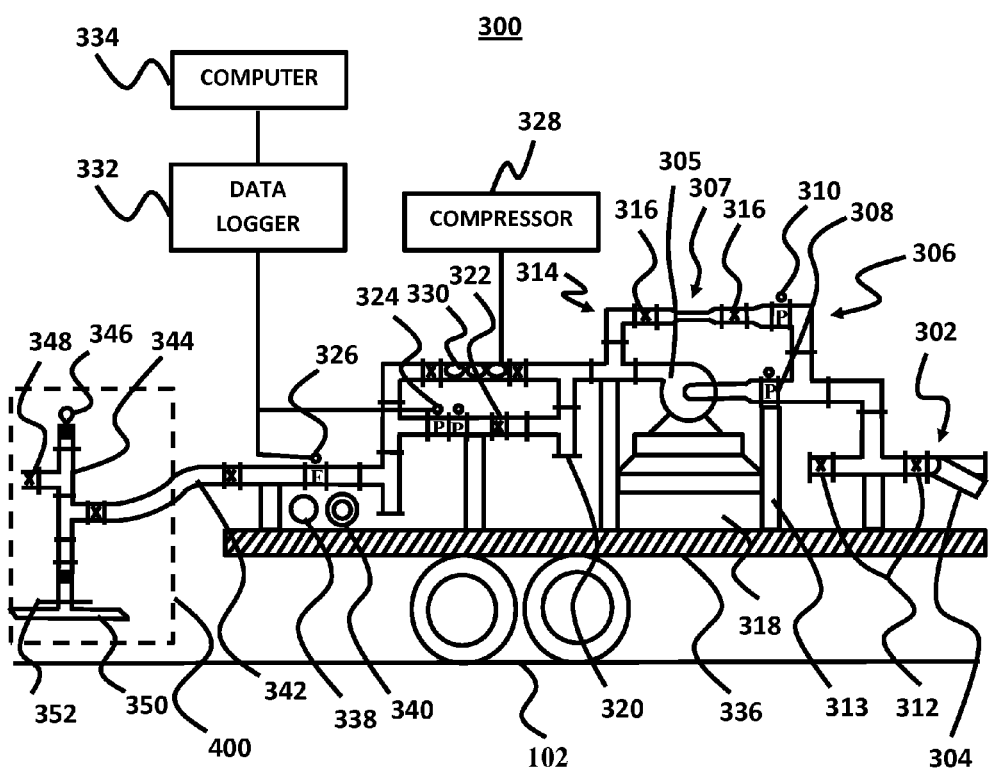
FIG. 3 is an illustration of the tree section and trailer section of FIG. 1.

A second flexible hose 222 may be configured to deliver the barren or treatment solution to the trailer section further illustrated in FIG. 3. Second flexible hose 222 may also enable site versatility in that it may enable the system 100 to be position near an injection well, as well as the supply of barren solution and vehicle 220 for reagent transport and off-loading. A length of 20 feet or more for second flexible hose 222 may be sufficient, but other lengths could also be used. It may be preferable to use materials for second flexible hose 222 and other components of the manifold section 200 and system 100 that have resistance to chemicals, reagents, abrasion, pressure and temperature. In an embodiment, the flexible hoses 214 and 222 may comprise, but are not limited to, braided stainless steel flexible hoses configured to withstand the higher temperatures, resistance to abrasion (e.g., longer life), and greater flexibility.

The inline filter 302 of the trailer section 300 of FIG. 3 is connected to second flexible hose 222. In an embodiment, the inline filter 302 is configured to remove particles in the treatment solution that could clog up the rest of the system 100 and damage the pump, as further described below. The inline filter 302 may be configured to include a screen that includes screen holes sufficient to remove large solids while reducing friction loss, and which can be readily purged of collected solids. In an embodiment, a purging value may be used to purge the inline filter and to ease disassembly for cleaning. In an embodiment, a pressure drop across the filter may be measured to show when the inline filter 302 requires purging and/or cleaning. In an embodiment, the inline filter 302 may include a vacuum break to prevent barren/treatment fluid from being siphoned backward in the event of a pressure build up in the inline filter 302. In an embodiment, the inline filter 302 may be formed of stainless steel to reduce potential corrosion. Other material may be used if compatible with the reagents and treatment solution chemistry.

In an embodiment, the inline filter 302 may include a connection to a variety of spool pieces or coupler pipes that have different lengths and angles to adjust and align the inline filter 302 coupling to the second flexible hose 222, which may facilitate rapid cleaning, purging and flexibility of installation. In an embodiment, a purging pipe 304, with fittings to direct the pressurized grit and reagents away from the system and crew may be incorporated into the inline filter 302.

Once the treatment solution has been filtered, it enters the pump inlet piping section 306, which may be configured to connect the inline filter 302 to the pump 305 and bypass and eductor 307, both of which are further described below. The pump inlet piping section 306 may include a pressure gauge 308 and a pressure transducer 310 configured to monitor pump 305 inlet pressures, which in combination with outlet pressure gauges, enables the calculation of changes in pressure versus volume imparted by the pump to stimulate each zone. In an embodiment, the trailer section may be configured to support the pump inlet piping section 306 so that inline filter 302, flexible hose 222, and manifold section 200 may be connected to either the right or left side of the trailer section 300. In an embodiment, the pump inlet piping section 306 may be readily isolated from one side to the other of the trailer section 300, depending on physical configuration of the collection. In an embodiment, the pump inlet piping section 306 may be replicated on both sides of the trailer section 300 and a valve 312 on each side of the trailer section 300 may be used to shunt treatment solution flow on the unused side of the trailer section 306.

As illustrated in FIG. 3, the pump inlet piping section 306 may connect the inline filter 302 and spool piece to the suction side of the pump 305 and various high pressure return lines from the pressure side of the pump 305. In an embodiment, pump inlet piping section 306 may be a nest of pipes, conduits, fittings, couplers, valves, instruments, flanges, connectors, spool pieces, angle fittings and pipe support structures, (four of which are shown, but only one of which is labeled as support 313 to simplify the drawing), not all of which are shown in FIG. 3 in order to simplify the illustration of the drawing. In an embodiment, the pump inlet piping section may include one or more bypass and eductor piping loops 307, only one of which is shown in FIG. 3. In one embodiment, more than one bypass piping loop 307 may be used, one for reagent addition and pump bypass and the other for cooling the pump engine. Both piping loops 307 extend from the pump inlet piping section 306 to the pump outlet piping section 314, with valves 316 on both ends of the piping loops 307.

Pump 305 may be a high pressure-high volume pump or pumps configured to connect the pump inlet piping section 306 to the pump outlet piping section 314. The pump 305 may be configured to easily handle solids that are of lesser size than the inline filter 302. The diesel pump-engine 318 may be configured to enable real time changes to the pressure and flow settings and to enable measurement of the in situ permeability in the collection, versatility for stimulation depths and zone stimulation under a variety of ore types and sizes, collection height, in collection voidage, and connecting barren/ treatment solution delivery capacity. Real time monitoring of the flow and pressure, using sensors and data logging as described below, enables control of the stimulation geometry, which determines the effectiveness of the treatment.

In an embodiment, the pump 305 may be a centrifugal pump with a 21 inch impeller that is powered by a diesel engine with an RPM controller. While existing systems are limited to stimulating collections up to 200 feet deep, with pressures limited to 150 psi and flow rates limited to 250 gallons per minute (gpm), embodiments can stimulate heaps/ collections from about 20 feet to over 600 feet deep, with pressures over 250 psi and flow rates over 1,300 gpm. Embodiments are configured to move up to approximately ⅜ inch solids of corrosive and abrasive chemical slurries at elevated temperatures.

As embodiments described herein do not rely upon hydraulic fracturing of the material within the heap/collection, it is important that the pump 305 create sufficient pressure, and the treatment solution be of an appropriate composition, so as to lift and mobilize material (rock and other materials) within a zone being stimulated, so as to create channels or fluid pathways in the unconsolidated material through which the treatment solution may flow in a largely horizontal path for some length through the zone. The structure of the material in the heap may prevent the treatment solution from travelling in a straight horizontal path. In addition, gravity and a loss of pressure over distance will eventually begin to cause the treatment fluid to travel in a vertical direction. Overall, however, much of the treatment solution will travel along a substantially horizontal path or channel for a measurable distance through the zone from the drill casing. That measurable distance may range from a ten feet to hundreds of feet. While much of the treatment solution will follow the channel, some treatment solution will vertically percolate from the channels as well, increasing the overall leaching of the zone. Hence, embodiments develop substantially horizontal channels that facilitate horizontal and vertical percolation and leaching through the zone being stimulated.

The bypass and eductor pipe loop 307 may be configured to connect the pump outlet piping section 314 to the pump inlet piping section 306. The bypass and eductor 307 may be configured to enable the treatment solution to flow without passing through the pump 305 by the use of one or more valves 316. This bypass of treatment solution may enable treatment solution to free flow (e.g., without flowing through the pump) and therefore measurement of the in situ permeability of the heap/collection. The bypass and eductor 307 may be comprised of a nest of pipes, conduits, flanges, connectors, spool pieces, angle fittings and an eductor, not all of which are shown in FIG. 3. This pipe and valve configuration may allow treatment fluid flow in both directions depending on valve 316 positions and whether the pump 305 is operating. An eductor loop may optionally be included that is configured to connect, via valves (not shown), the pump outlet piping section 314 with the pump inlet piping section 306 and to induce a vacuum to the bypass pipe loop. Both the bypass and educator 307 may enable the addition of other fluids, pulps, reagents and chemicals to the system 100 without an additional pump being required.

The pump outlet piping section 314 may be configured to connect the pump 305 and bypass and educator 307 to the pump inlet piping section 306 for transfer of reagents to the treatment solution 307. The pump outlet piping section 314 may include: drain down fittings and valves 320; additional pump bypass 322 configured to route treatment fluid around other equipment so as to enable equipment cooling, mixing reagents, and operational solutions as discussed above; pump outlet pressure gauge and pressure transducer 324; flow meter 326; air injection and inline mixer pipe loop 330 which, as further described below, may be configured to enable compressed air to be used as a reagent, to be metered into the barren/treatment solution from a high pressure air mechanism at high solution pressures, promoting the mixing of the air in the inline mixer 330, thus significantly increasing the concentration of dissolved oxygen in the treatment solution; and gas injection and inline mixer pipe loop 330 which is configured to enable compressed gas or a mixture of gasses, as reagents, to be metered into the treatment solution from a system of gas storage cylinders through a combination of tubes, compressors, pipes, hoses, valves, check valves, gauges, and flow meters at pressures greater than the high solution pressures, promoting the mixing of the gas in the inline mixer, and thereby significantly increasing the concentration of dissolved gas or gas mixtures in the barren/treatment solution.

The air mechanism is configured to compress outside (in situ) air via a low volume, high pressure air compressor 328, and thereafter transport and deliver that regulated compressed air for a number of uses, including by an inline air receiver tank via pipe, tube and valves; the air injection and inline mixer pipe loop 330 via pipe, tube, valves, flow meter; a downhole inflation line via pipe, tube, valves, regulator and hose reel; a downhole zone isolation mechanism: a reagent addition and pneumatic valve control; and miscellaneous uses of pressurized air like pneumatic tools, tire inflation, etc. The high pressure, air mechanism is configured to compress outside air via a low volume, such as 33 L/min, high pressure, such 1,000 psi, compressor, as only a modest amount of compressed air is required at any one time. The mechanism may be comprised of the compressor 328 and a nest of pipes, conduits, tubes, hoses, valves, connectors, flow meters, tanks and instruments.

The air injection and inline mixer 330 may be configured to meter and mix compressed air into the treatment solution. In an embodiment, the mixer 330 may be configured to enable super saturation of dissolved oxygen into the treatment solution, as well as the metering and mixing of other gases instead of air or oxygen. The mixer 330 may also be comprised of a nest of pipes, conduits, valves, flanges, connectors, spool pieces, angle fittings and an inline mixer. As the mixer 330 is downstream from the pump 305, the mixer may be configured to accommodate 1,000 psi compressed air from the air mechanism, versus relying upon compressed air or gas from cylinders or tanks that have to be transported to the well site. The use of the air mechanism in combination with the mixer 330 also enables the system 100 to stimulate areas within the heap/collection at depths greater than 200 feet without the need for hydraulic fracturing. In addition, by mixing reagents and chemicals into the treatment solution in the manifold section 200, versus in the inline mixer 300, corrosion and abrasion within the mixer may be significantly reduced.

In an embodiment, the system 100 may be equipped with a real time monitoring system or data logger 332 and computer 334 that may be configured to monitor fluids and gases within the system 100 and characteristics of those fluids and gases so as to track system performance and the physical properties encountered in the zonal stimulation of ore deep in the heap/collect. This monitoring determines the overall efficiency of stimulation by monitoring one or more of: inline filter inlet and outlet pressure; pump inlet and outlet pressure; air and/or gas injection and inline mixer pipe loop fluid flow; downhole isolation mechanism pressure (which enables higher pressures allowing the system to stimulate to much greater depths of wells); pump drive motor performance, rpm, temperature, fuel usage, horsepower, torque, etc.; pump volume (gpm and total); and time. In an embodiment, the data logger may include a commercially available data logger with a 4-20 mA input and output to a flash drive, or configured to communicate remotely with a local or remote computer through known means.

All of the above-noted components of the trailer section 300 may be mounted on a flat-bed type, or other type, of trailer 336 that is configured to align such components with supply fluids and the well into which such fluids are going to be pumped, and to dedicate all of the pumped fluids to a specific zone at a specific depth within the collection. In addition to easing positioning of the trailer relative to the well to be drilled, the trailer may facilitate the ready modification of selected components so as to enable the system 100 to achieve specific results.

The trailer 336 may be configured and fabricated for ease of operation, safety, maintenance, transportation, keeping the equipment clean, with storage of parts, tools, fuel, etc. In an embodiment, all the equipment on the trailer 336 may be operated from the ground, thus keeping the operators from climbing onto the trailer 336 and risking an injury. The 336 trailer may also be selectively designed and fabricated with swivel leveling feet to allow the feet to swing horizontal for travel over rough, uneven ground without (or with minimal) damage to the feet. The trailer 336 may also be used to stabilize and support the various components during use and to ease assembly and disassembly.

Additional components that may be mounted to the trailer 336 include, but are not limited to, hose reel 338 and compressed air receiver tank 340. Hose reel 338 is configured to enable a high pressure tube or hose form the high pressure air mechanism to be metered out safely and to inflate and deflate the downhole isolation mechanism down in the well, as further described below. The reel 338 may include many feet of inflation tube that coils. As this may present a tripping hazard, it may be desirable to protect the inflation tube as it contains high pressure air or gas that could cause significant injury or damage if damaged or allowed to come loose. The inflation tube is connected to the air receiver tank 340, through valves, pipe, tube, hose, fittings and the hose reel, down the well to the downhole isolation mechanism. The air receiver tank 340 may be configured to operate as a reservoir for compressed air generated by the high pressure air mechanism so that mechanism is only required to operate intermittently with a drop in pressure. In an embodiment, the tank 340 may be a 72 cubic foot, 4,500 psi tank and may be mounted horizontally across the trailer and connected as necessary by a nest of tubes, hoses, pipes, conduits, valves and gauges.

The tree section 400 also illustrated in FIG. 3 may be comprised of a nest of pipe, conduits, valves, flanges, connectors, spool pieces, angle fittings, and adapters configured to connect high pressure flexible hose 342 to the downhole injection pipe 344, to ease assembly/disassembly and to reduce pressure in the system 100 prior to disassembly. The hose 342 is configured to enable treatment solution to flow from the pump outlet piping section 314 to the tree and enables the tree section 400 to be removed from the top of the well for ease of adding and removing joints of the downhole injection pipe, so as to change from one perforation zone to another in the downhole well. In an embodiment, the hose 342 is between 8-10 feet in length and is formed of a flexible conduit or hose with couplers/flanges that can withstand the internal pressure and temperature of the treatment solution, and has resistance to chemicals, reagents and abrasions used in the treatment solution.

The tree section 400 also helps to insure that the downhole injection pipe will not fall down the well. In an embodiment, the tree section 400 may include a picking eye 346 fabricated and installed so the tree can swivel on and off the well head with ease, including rapid assembly and disassembly, and to bleed off fluid pressure prior to disassembly (essentially acting as a vent for the downwell section 500). The tree section 400 may also include a sample port 348 for testing the treatment solution. The tree section 400 may be designed and fabricated to safely support itself during disassembly of the downhole injection pipe during changes in the stimulation depth, from one zone to another.

The tree section may further include a table 350 with a flat, substantial plate of steel, with preferably rounded corners for safety, attaches by bolts to the downhole well head and downhole collar to support the foot clamp 352, the downhole injection pipe, the downhole isolation mechanism, and all the tooling and equipment inserted through a hole in the table into the cased well during the stimulation. In addition, in order to maintain the foot clamp 352 centered over the well, a unique pattern of steel bar stock are welded to the table 350 as stops to maintain the position of the foot clamps without altering the foot clamp's function. The foot clamp 352 may be a standard drill tool modified to handle the larger downhole injection pipe and inflation tube. The modifications are done in a manner as to not significantly distract from the structural integrity of the foot clamp while enabling the foot clamp 352 to handle a larger pipe application than is typically used in well-based leaching operations.

The location of each well for a heap/collection is determined based on the chemical analysis of one or more core samples taken from the heap/collection and/or metal production and heap operational history, rather than any form of geophysical surveying. While the term "geophysical surveying" can involve a number of different principals, such as the utilization of chemicals, dyes and/or one or more instruments spread across the surface of the heap/collection, and sometimes within the collection and/or well, from which various geophysical properties can be sampled, such as chemical compositions, gravity, heat flow, vibrations, conductivity, electricity, electromagnetic waves, magnetism and fluid dynamics, geophysical surveying does not involve the use of core samples. In contrast, in an embodiment, based on operational history and/or the chemical analysis of the core samples, determinations may be made on where a well should be located. For example, if a particular core sample revealed that a particular section of a heap/collection contained more than an expected level of a target mineral, that particular section of the heap/collection could become the location of one or more wells.

Each well may be uniquely designed for each location. This unique design is dependent upon the specific zone and volume of ore that contains the target metal to be recovered. The installation of the well includes the use of a drill pipe 104 and drill casing 106 to fit the potential solution flow and stimulation process. The well has a welded wellhead (not shown) attached on the top of the well to attach the table and the remainder of the rinse-releach system 100.

Figure 4:
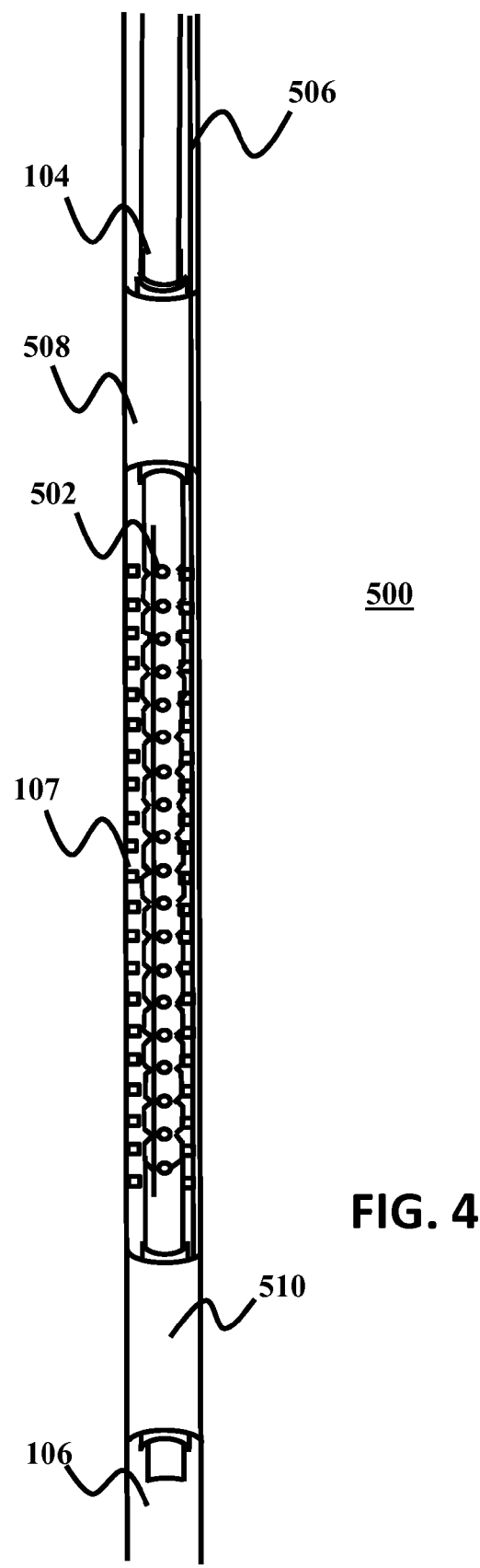
FIG. 4 is an illustration of the down well section of FIG. 1.

In particular and as further described below, the drill casing 106 may be perforated and designed, fabricated and installed for each unique location. The drill casing 106 keeps the pile (rock and sand) from flowing into the well and enables treatment fluid to pass into heap/collection via specifically designed perforations 107 at specific depths or zones. As illustrated in FIG. 4, the perforations 502 of the injection pipe 104 are aligned with the perforations 107 in the casing 106. The perforations 107, at least, are configured in a unique pattern to direct the treatment solution flow during stimulation (pumping) in a specific angular direction or arc or unilaterally (360 degrees) into a targeted volume of material or zone in a heap/collection. In an embodiment, the downhole perforations 107 may be designed and fabricated such that the sum of the perforation opening at each zone into the heap are greater than the cross section area of the well, so as to not impede fluid flow through the well casing 106. For example, if it were determined that a zone of a heap to the north of the well largely remained unleached of the target material, while a zone to the south was largely leached of the target material, the perforations 107 may be designed to all be located on the north side of the casing 106. Likewise, when a well is close to a heap lift crest or sideslope, the perforations 107 may be directed toward the body of the heap and not the side slope.

As further illustrated in FIG. 4, the downhole injection pipe or drill pipe 104 is inserted inside the casing 106. The downwell injection pipe 104 transports the treatment solution from the surface of the well to the target perforations 107 down in the well. In order to fully utilize the available flow to new depths, the downwell injection pipe 104 may be a suitable diameter (e.g., OD about 4.5 inch or about 11.4 cm) by selecting pipe joints, for example HWT pipe, to carry the injection fluid, which allows the flow to be fully utilized and to significantly reduce pressure loss. The downhole injection pipe may include a downhole inflation line 506 and attachment mechanism configured to activate the downhole isolation mechanism and to ease operation while maintaining the integrity and construction of the downhole inflation line 506. The inflation line 506 may be a high pressure flexible hose or tube that will fit through the table 350 and foot clamp 352 and may be secured to the downhole injection pipe 104 in the tight space that exists between the pipe 104 and well casing 106. In an embodiment, the inflation line 506 may be secured to the downhole injection pipe 104 at each joint and in the middle of each joint to reduce wear and perforation or breach of the inflation line 506.

The downhole isolation mechanism 508/510 may be configured and selected to allow versatility of sealing each zone independent of the remaining zones in the well and to dedicate all of the pumped fluids to a specific zone at a specific depth. The mechanism 508/510 may be fabricated from one or more inflatable straddle packers selected to accommodate the high pressure (1,000 psi inflation), corrosive and abrasive chemical slurries and elevated temperatures. The downhole isolation mechanism 508/510 is configured to straddle the zone, with one unit above 508 and one unit below 510 designated with sufficient space above and below the zone such that the downhole isolation mechanism can seat and seal the zone from the remainder of the well. The downhole isolation mechanism is inflated from inflation line 506 from the hose reel 338, through pipes, valves, fittings, tubes, and a pressure gauge, connected to the air receiver tank 340. The zones are usually stimulated beginning from the bottom of the well and ending at the top of the well in order to reduce the weight of the injection fluids on underlying zones.

In order to store the downhole injection pipe 104 in a safe, clean manner, a pipe rack may be configured and constructed. In an embodiment, two pallets may be placed flat on the ground and arranged with their boards parallel to the pipe to be placed on them, thereby supporting the downhole injection pipe 104 off the ground. Spacing the two flat sections apart may allow the insertion of a chain or strap under the stack of pipe for lifting the pipes. In addition, a third section may be placed upright and perpendicular to an end of one of the flat sections, and away from the well, and secured to the flat laying section by fasteners and angled members. This pipe rack configuration minimizes rolling and slipping of the downhole injection pipe onto walkways and crew, while keeping the downhole injection pipe clean and easily accessible for installation in and out of the well.

A boom truck or crane may be used to support the installation of the downhole/down well section 500, including the injection pipe 104, the inflation line 506 and the isolation mechanism 508/510. The truck or crane can also transport and assist with the assembly and disassembly of the system 100 from well to well. In an embodiment, the boom truck may be a 26 ton flatbed boom truck or crane with out-rigging stabilizers with sufficient reach and mobility to safely maneuver the downhole mechanisms up and down the well during operation and assembly/disassembly.

An electrical generator (not shown) may also be used to power electrical equipment used by the system 100 when operating in remote locations. In an embodiment, the generator may be selected for low fuel consumption, quiet operation, ease of maintenance and reliability at high altitudes, enabling the operation of the equipment for high altitudes. Other special tools and features that may be needed to support operation of the system include; a picking bale for HWT pipe configured to lift the downhole injection pipe 104 and downhole tools; a tree 400 lifting eye; a stand for supporting the tree 400; and inline filter blow down; a purge pipe that may be placed to direct the blow down from the inline filter away from the crew and trailer; a downhole isolation mechanism maintenance work station; a trailer section 300 work station; and a flow meter protection hood. The flow meter protection hood may be a steel hood, or similarly strong material, that is configured to protect the flow meter, especially during windy operation when components being lifted by the boom truck could be blown into the trailer section 300 and potentially damage the flow meter and other expensive equipment.

Operation of the system 100, which is marketed under the trademark HYDRO-JEX™, a trademark of the present assignee, will now be described. After identifying an area or zone of the heap/collection to be further leached, a well hole is drilled and the casing 106 and drill pipe 104 are installed. One or more of the various downhole components described above may then be installed in the well while the system 100 is set up and laid out for safety and ease of operation. In order to determine the permeability of the heap at a zone before and after stimulation, the in situ permeability of the zone is tested by introducing barren solution into the well and measuring the permeability of the zone. The zone can then be stimulated for some predetermined or calculated period of time, which is determined by a large number of factors, including the type of heap, the target materials, the prior level of leaching, the chemistry of the heap, etc. the in situ permeability of the zone can then be retested to determine whether stimulation caused any measurable change in permeability (which can also be mathematical modeled based on various measured physical parameters). Additional, subsequent stimulation may include, but are not limited to: changes to pump speed and pressure; changes to flow volumes; the addition of reagents; different mixes of treatment solutions; cooling through the use of any one or more of milk of lime, dissolved oxygen and other gases; extra dissolution reagents, etc.

Once a zone of the heap/collection has been sufficiently stimulated so as to hydraulically rechannel the zone/collection, and a sufficient period of time has elapsed (such period correlating to the standard leach curve for the target material), an impacted or stimulated (pumped) zone may be ready for rinsing of the dissolved target materials from the zone, and then possibly re-leached with a different composition of treatment solution, possibly with different or additional reagents, to further leach the same target material or to leach a different target material. For example, the flow rate may be optimized and the process may be improved by adding new fluids over a period of time, such as a 3-5 day period, and correlating the volume of solution added to the sum of the void space in the impacted zone of material (e.g., calculating the volume required to maximize metal dissolution without dilution). The normal barren pressure and flow may be sufficient to wet, rinse and releach the impacted zone.

Figure 5:
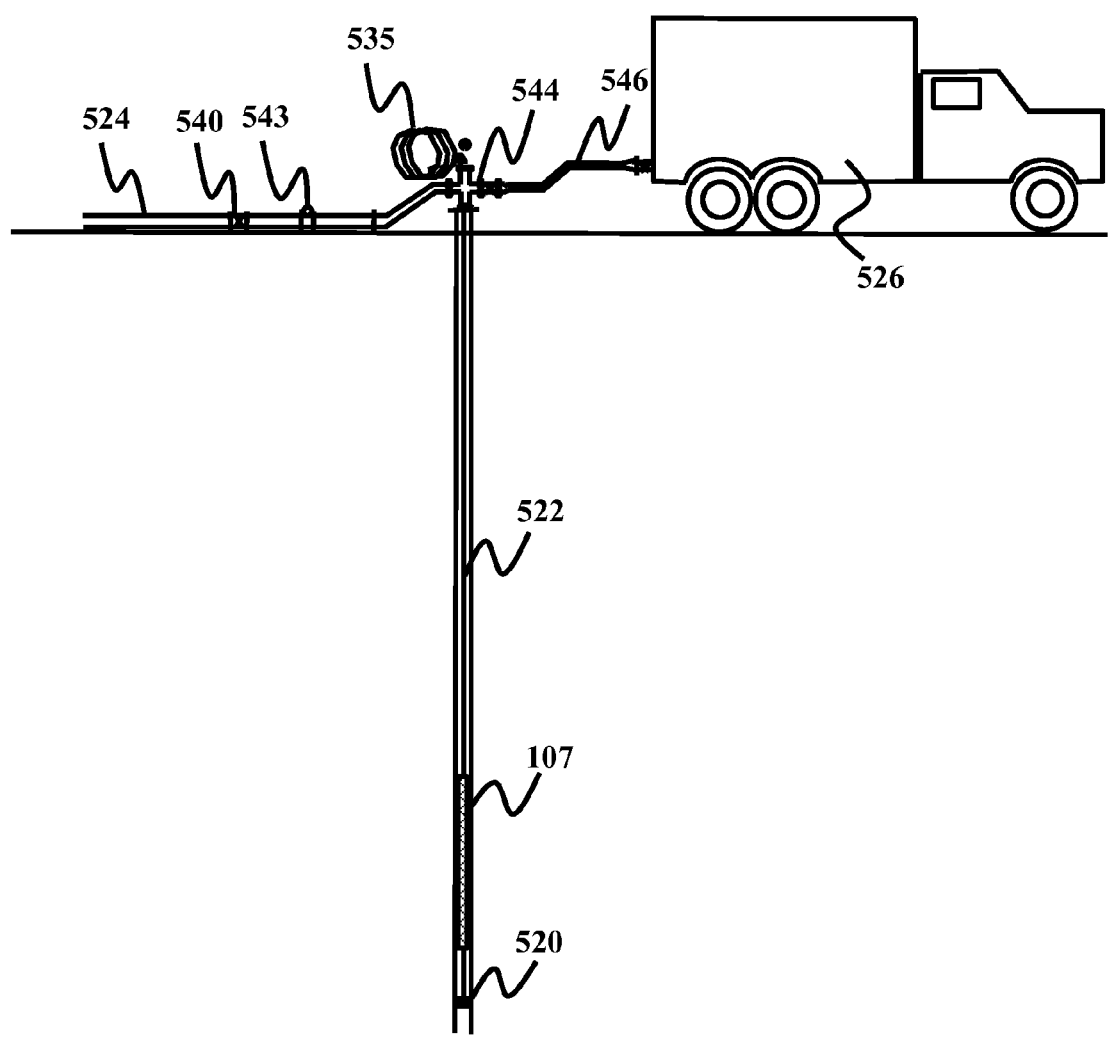
FIG. 5 is an illustration of a rinse and releach system in accordance with an embodiment.
Figure 6:
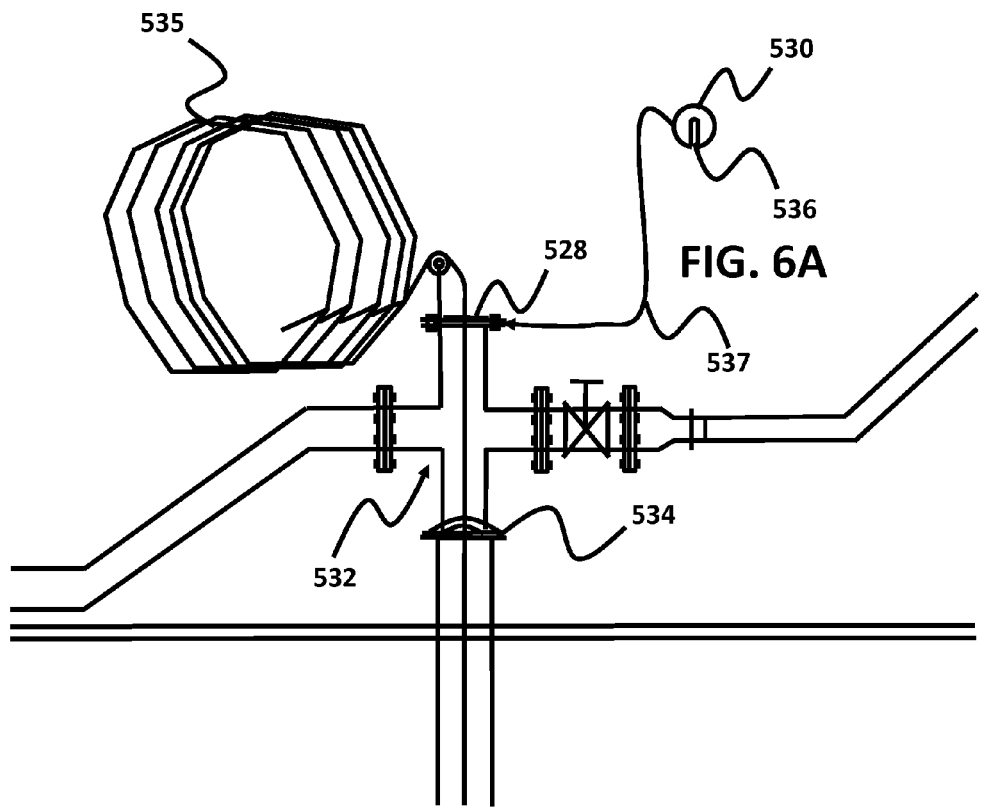
FIG. 6 is an illustration of the well top section of FIG. 5.
Figure 7:
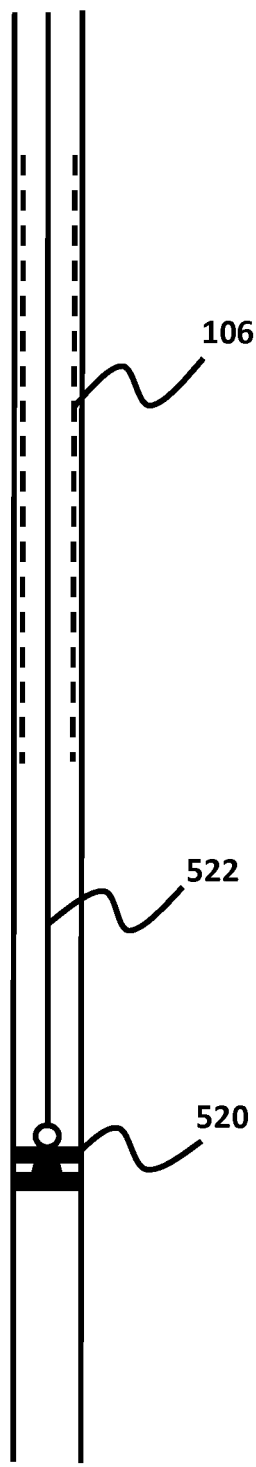
FIG. 7 is an illustration of the down well section of FIG. 5.

The rinse and releach process is further illustrated in FIGS. 5-7. After the downhole isolation mechanism 508/510 is removed from the well, a releach plug 520 may be inserted and moved up and down the well bore so as to direct fluid to a selected zone. The releach plug 520 may be configured to easily move up and down the well, suspended on a cable 522 with optional depth indicator tags, the combination of which referred to herein as the releach plug system. The releach plug system may be configured to provide a relatively tight seal within the well below the target zone (i.e., below the perforated portion of the well casing 106), thereby isolating the target zone and closing off the well casing 106 below the releach plug 520 from significant bypass of fluids around the releach plug 520. The releach plug 520 may be configured to include one or more mechanical devices that allow the releach plug 520 to spin freely and to continue its operation in the presence of any spinning action that may be induced by the rinsing action. (e.g., neutralize Coriolis effect).

The rinse and re-leach plug system is designed to take advantage of the fact that a falling column of water in a well that has rapid evacuation at a selected zone will impart a partial vacuum at the well head. For example, after a zone is stimulated, voids may be created in the heap/collection that allow rapid evacuation of fluids from the well into the heap and prevent solution building head in the well. When solution is flowing down the well casing 106 to the secured releach plug 520, the falling fluid imparts a vacuum to the well head 534 and/or attached tee or cross fitting 532 of the tree section 400. This vacuum allows chemicals, reagents and fluids to be added to the selected zone, down the well without any further pumping. If solid reagents are added prior to installing the cross or tee 532, these reagents or chemicals must be dissolvable by the barren solution to prevent closing or blocking the perforations in the well casing 106 over time. This addition of reagents, chemical and fluids to the falling barren/treatment solution allows mixing and gas saturation into the barren/treatment solution. The reagents and chemicals may be supplied by chemical transport 526. The tee or cross fitting 532 could be used in place of the components of the tree section 400 illustrated in FIG. 3, or the components of the tree section 400 could be used in place of a tee or cross fitting 532 during rinse and release operations.

The suspension cable 522 to which the releach plug 520 is attached may be selected to have sufficient strength to support the entire weight of the rinsing solutions at depth, plus its own weight. In an embodiment, the cable 522 may be formed of stainless steel cable. Optional footage tags (not shown) on the cable 522 serve to locate the zone in the well. Referring now to FIG. 6, the cable 522 may be designed and fabricated for easy up and down movement in the well, i.e., to move from one zone to another, without loss of functionality over time. The cable 522 may be raised and lowered by any method, but in an embodiment a simple winch mechanism may be used. In a second embodiment, a cable clamping tool (not shown), which is attached to a chain, strap, or short cable, may be used. When the cable clamping tool is attached to the cable 522, it also attached to a small motorized vehicle to lift the cable 522, cable clamp(s) 528, and releach plug 520 over the cable directional spool piece to keep the cable 522 in the center of the well. When the releach plug 520 is in place below the selected zone, the slotted plate 530 may be inserted in an opening at the top of the tee or cross fitting 532, as illustrated by the arrow 537, where the slotted plate 530 may be able to catch a cable clamp 528 in the slot 536, illustrated in FIG. 6A, thus suspending the releach plug system. The cable clamping tool may then be removed from the cable 522. The unused top cable and unused attached cable clamps are stored in a coil or placed around a hose reel 535.

Cable clamps 528 may also be used to hold the cable 522 in place at selected zones while suspending the releach plug 520 down the well. The slotted plate 530 may be easily removed when the cable 522, cable clamp(s) 528 and releach plug 520 are raised and lowered, up and down the well to select a zone. When the zone is selected, the slotted plate 530 may be inserted on the top of the tee or cross fitting 532, just below the clamp 528. The slot 536 in the slotted plate 530 may be smaller than the cable clamp 528, thereby holding the suspended cable 522 and releach plug 520, and helping to transfer load to the tee or cross fitting 532.

The barren pipe 524 may be connected to additional angled pipe fittings and spool pieces (not shown) to make a connection to an elevated tee and/or cross fitting 532. A valve 540 may be used to regulate the flow of barren solution from barren pipe 524. The flow of barren solution can be monitored by flow meter 543, which could include a Doppler clamp and flow meter for non-intrusive flow detection. Likewise, a valve 544 may be used to regulate the flow of reagents and chemicals from the chemical transport 526 through flexible hose 546.

As noted, treatment solutions and fluids containing reagents and chemicals may be added during rinsing and releach into the well, directed by the releach plug 520, through the well casing perforations 107 into the previously impacted zones created by the stimulation system. The volume of rinse, releach solution and fluids is added in correlation to the void space of the previously impacted zone. The zones may be rinsed and new reagents and chemicals may be added generally from the top zone in the well downward, one zone at a time. Thus, the rinsing curtain of solution and fluid is flowing down through the previously impacted, channeled ore from top to bottom, rinsing the ore with good sweep efficiency and again adding new reagents and chemicals to renew the leaching process until the next time for that zone is selected for rinse and releach. The time spent between well and zone selection is determined by the leach cycle and leach curve In an embodiment a system for recovery of a target material from a collection of materials over a collection pad through a leaching process, comprises: a manifold configured to transport a barren solution for leaching treatment of a zone within the collection containing the target material and to transport and combine the barren solution with one or more chemicals to form a treatment solution; a mobile platform configured to receive the treatment solution from the manifold, mix the treatment solution and pump the treatment solution into a tree section configured to be connected to the mobile platform and connected to a well head of a well drilled into the collection above the zone; and a downwell section including a drill casing having a perforated casing section configured to be installed into the well from the well head, a drill pipe having a perforated pipe section configured to be inserted into the drill casing from the well head and to position the perforated pipe section with the perforated casing section, and an isolation mechanism configured to be inserted into the well from the well head and to seal the drill casing above and below the perforated casing section so as isolate the flow of treatment solution pumped into the tree section, through the well head, down the drill pipe, through the perforated pipe section and through the perforated casing section into the zone so as to lift and mobilize some of the materials within the zone of the collection so as to create a plurality of substantially horizontal channels within the zone through which the treatment solution flows to dissolve the target material for collection from the collection pad.

In the embodiment, wherein the chemicals include reagents transported to the collection by a vehicle or pipeline.

In the embodiment, wherein the chemicals include one or more solutions, solids and/or slurry transported to the collection by a vehicle or pipeline.

In the embodiment, wherein the mobile platform includes an inline filter for removing one or more solids from the treatment solution if the one or more solids exceeds a predetermined size.

In the embodiment, wherein the mobile platform includes a pressure gauge and a pressure transducer configured to monitor pressure at the inlet to the inline filter and a purging value configured to purge and clean the inline filter.

In the embodiment, wherein the mobile platform includes a pressure break and a purging value configured to purge and clean the inline filter.

In the embodiment, wherein the manifold is configured to combine the one or more solids with the treatment solution to form a slurry as the treatment solution.

In the embodiment, wherein the mobile platform includes a compressor configured to produce a volume of compressed air, wherein the downwell section includes an inflation line configured to receive the compressed air from the compressor and to be inserted into the well from the well head, and wherein the isolation mechanism is configured to receive the compressed air from the inflation line and to seal the drill casing above and below the perforated casing section when inflated by the compressed air.

In the embodiment, wherein the compressed air is in situ.

In the embodiment, wherein the mobile platform includes a compressor configured to produce a volume of compressed air, and wherein the mobile platform includes an inline mixer configured to inject the compressed air into the treatment solution.

In the embodiment, wherein the mobile platform includes a compressor configured to produce a volume of compressed gas, and wherein the mobile platform includes an inline mixer configured to inject the compressed gas into the treatment solution.

In the embodiment, wherein the mobile platform includes a series of bypass loops configured to bypass a pump and an inline mixer to deliver barren solution or treatment solution to the tree section.

In the embodiment, wherein a flexible hose connector is configured to connect the manifold to the mobile platform.

In the embodiment, wherein the mobile platform includes a pump inlet piping system, wherein the system further comprises a flexible hose connector configured to connect the manifold to the pump inlet piping system, and wherein the pump inlet piping system is configured to route barren solution or treatment solution to a pump or a bypass loop.

In the embodiment, wherein a flexible hose connector is configured to connect the mobile platform to the tree section.

In the embodiment, wherein the mobile platform includes a pump and a bypass and eductor line configured to enable incoming treatment solution to bypass the pump, to enable treatment solution to be recycled back to an inlet of the pump inlet from an outlet of the pump discharge, and to enable inlet of other fluids through an educator of the bypass and eductor.

In the embodiment, wherein the mobile platform includes one or more flow meters configured to measure treatment solution flow rates and one or more pressure gauges to measure treatment solution pressure for analysis by a computer to determine mobile platform performance and operational status.

In the embodiment, wherein the mobile platform includes a data logger for capturing data from the one or more flow meters and the one or more pressure gauges for analysis by the computer.

In the embodiment, wherein the mobile platform includes the use of a computer.

In the embodiment, wherein the tree section includes a table and a foot clamp configured to route to the well head and to suspend and protect the drill casing, the drill pipe, the inflation line and the isolation mechanism.

In the embodiment, wherein the mobile platform includes a compressor configured to produce a volume of compressed air, wherein the downwell section includes an inflation line configured to receive the compressed air from the compressor and to be inserted into the well from the well head, wherein the isolation mechanism is configured to receive the compressed air from the inflation line and to seal the drill casing above and below the perforated casing section when inflated by the compressed air, and wherein the foot clamp is configured to route to the well head and to protect the inflation line.

In the embodiment, further comprising a pipe rack configured to store one or more downwell section components.

In the embodiment, wherein the downwell section further includes a releach plug configured to plug the drill casing below a zone so as to enable a rinse solution to be introduced into the zone after a leaching operation.

In the embodiment, wherein the releach plug includes a mechanical swivel configured to enable the releach plug to continue plugging the drill casing in the presence of any spinning action that may be induced in the drill casing by introduction of the rinse solution.

In the embodiment, wherein the downwell section includes a cable suspension system configured to hold at least the releach plug, the suspension system, and the rinse solution at a depth of the zone to be rinsed.

In the embodiment, wherein the cable suspension system includes one or more cable clamps fastened to a cable of the cable suspension system at one or more locations on the cable to suspend the releach plug below the zone, and may include one or more depth markers attached to each of the one or more cable clamps.

In the embodiment, wherein the tee or cross fitting section includes a slotted plate configured to pass the cable into the well head and a cable clamp configured to suspend the cable from the tee or cross fitting section.

In the embodiment, wherein the system is configured to enable introduction of a falling column of the rinse solution to the drill pipe at the well head to result in rapid evacuation of the zone with rinse solution.

In an embodiment wherein a method for recovering a target material from a collection of materials over a collection pad through a leaching process, comprises the steps of: possibly collecting one or more core samples from the collection; analyzing the operational history of the collection pad and/or one or more core samples to determine one or more zones within the collection where the target material needs to be further leached; transporting a barren solution for leaching treatment of a zone among the one or more zones through a manifold to a mobile platform containing an inline mixer and a pump; transporting and combining one or more chemicals with the barren solution to form a treatment solution; mixing and pumping the treatment solution from the mobile platform into a tree section connected to a well head of a well drilled into the collection above the zone, wherein the a downwell section in the well includes a drill casing having a perforated casing section configured to be inserted into the well from the well head, a drill pipe having a perforated pipe section configured to be inserted into the drill casing from the well head and to align the perforated pipe section with the perforated casing section, and an isolation mechanism configured to be inserted into the well from the well head and to seal the drill casing above and below the perforated casing section; isolating flow of the treatment solution pumped into the tree section, through the well head, down the drill pipe, through the perforated pipe section and through the perforated casing section into the zone; and lifting and mobilizing some of the materials within the zone of the collection with the treatment solution pumped into the zone to create a plurality of substantially horizontal channels and within the zone through which the treatment solution flows to stimulate and dissolve the target material for collection from the collection pad.

In the embodiment, further comprising the step of rinsing the zone with a rinse solution after stimulation of the zone for a predetermined leach period.

In the embodiment, wherein the step of rinsing the zone does not require the rinse solution to be pumped into the zone.

In the embodiment, after the step of rinsing, further comprising the step of repeating the steps from transporting the barren solution to the step of again using stimulation (pumping) and/or releaching until a measured level of target material has been collected from the collection pad.

The methodologies described herein may be implemented by various methods, depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein may be presented in terms of symbolic representations of operations on binary digital signals stored within a memory of a specific apparatus or special purpose computing device or platform. In the context of this particular specification, the term computer or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical, pneumatic or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "for example," "an example," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Well known process steps and structures have not been described in detail in order to not unnecessarily obscure the other descriptions provided herein. Additionally, many modifications may be made to adapt a particular situation to the teachings of the disclosed subject matter without departing from the central concept described herein. Therefore, it is intended that the disclosed subject matter not be limited to the particular examples disclosed.

What is claimed is:

1. A system for recovery of a target material from a collection of materials over a collection pad through a leaching process, comprising:
    a manifold configured to transport a barren solution for treatment of a zone within the collection containing the target material and to transport and combine the barren solution with one or more chemicals to form a treatment solution;
    a mobile platform configured to receive the treatment solution from the manifold, mix the treatment solution and pump the treatment solution into a tree section configured to be connected to the mobile platform and connected to a well head of a well drilled into the collection above the zone; and
    a downwell section configured to be installed into the well from the well head including a drill casing having one or more perforated sections, a drill pipe having a perforated pipe section configured to be inserted into the drill casing and to position the perforated pipe section relative to one of the perforated sections, and an isolation mechanism configured to seal the drill casing above and below the perforated section so as isolate the flow of treatment solution pumped into the tree section, through the well head, down the drill pipe, through the perforated section and through the perforated casing section into the zone so as to lift and mobilize some of the materials within the zone of the collection so as to create a plurality of substantially horizontal channels within the zone through which the treatment solution flows to change the chemistry of the materials and/or dissolve the target material for collection from the collection pad.

2. The system as recited in claim 1, wherein the chemicals include reagents transported to the collection.

3. The system as recited in claim 1, wherein the chemicals include one or more solids or slurries transported to the collection.

4. The system as recited in claim 3, wherein the mobile platform includes an inline filter for removing the one or more solids from the treatment solution if the one or more solids exceed a predetermined size.

5. The system as recited in claim 4, wherein the mobile platform includes a pressure gauge and a pressure transducer configured to monitor pressure at the inlet to the inline filter and a purging value configured to purge and clean the inline filter.

6. The system as recited in claim 4, wherein the mobile platform includes a pressure break and a purging value configured to purge and clean the inline filter.

7. The system as recited in claim 4, wherein the manifold is configured to combine the one or more chemical solutions, slurries or solids with the barren solution to form the treatment solution.

8. The system as recited in claim 1, wherein the mobile platform includes a compressor configured to produce a volume of compressed air, wherein the downwell section includes an inflation line configured to receive the compressed air from the compressor and to be inserted into the well from the well head, and wherein the isolation mechanism is configured to receive the compressed air from the inflation line and to seal the drill casing above and below the perforated casing section when inflated by the compressed air.

9. The system as recited in claim 8, wherein the compressed air is in situ.

10. The system as recited in claim 1, wherein the mobile platform includes a compressor configured to produce a volume of compressed air, and wherein the mobile platform includes an inline mixer configured to inject the compressed air into the treatment solution.

11. The system as recited in claim 1, wherein the mobile platform includes a compressor configured to produce a volume of compressed gas, and wherein the mobile platform includes an inline mixer configured to inject the compressed gas into the treatment solution.

12. The system as recited in claim 1, wherein the mobile platform includes a series of bypass loops configured to bypass a pump and an inline mixer to deliver barren solution or treatment solution to the tree section.

13. The system as recited in claim 1, wherein a flexible hose connector is configured to connect the manifold to the mobile platform.

14. The system as recited in claim 1, wherein the mobile platform includes a pump inlet piping system, wherein the system further comprises a flexible hose connector configured to connect the manifold to the pump inlet piping system, and wherein the pump inlet piping system is configured to route barren solution or treatment solution to a pump or a bypass loop.

15. The system as recited in claim 1, wherein a flexible hose connector is configured to connect the mobile platform to the tree section.

16. The system as recited in claim 1, wherein the mobile platform includes a pump and a bypass and eductor line configured to enable incoming treatment solution to bypass the pump, to enable treatment solution to be recycled back to an inlet of the pump inlet from an outlet of the pump discharge, and to enable inlet of other fluids through an eductor in the bypass.

17. The system as recited in claim 1, wherein the mobile platform includes one or more flow meters configured to measure treatment solution flow rates and one or more pressure gauges to measure treatment solution pressure for analysis by a computer to determine mobile platform performance and operational status.

18. The system as recited in claim 17, wherein the mobile platform includes a data logger for capturing data from the one or more flow meters and the one or more pressure gauges from to analysis by the computer.

19. The system as recited in claim 18, wherein the mobile platform configured to communicate with a computer.

20. The system as recited in claim 1, wherein the tree section includes a table and a foot clamp configured to route to the well head and to protect the drill casing, the drill pipe, and an inflation line connected to the isolation mechanism.

21. The system as recited in claim 20, wherein the mobile platform includes a compressor configured to produce a volume of compressed air, wherein the inflation line is configured to receive the compressed air from the compressor and to be inserted into the well from the well head, and wherein the isolation mechanism is configured to receive the compressed air from the inflation line and to seal the drill casing above and below the perforated casing section when inflated by the compressed air.

22. The system as recited in claim 1, further comprising a pipe rack configured to store one or more downwell section components.

23. The system as recited in claim 1, wherein the downwell section further includes a releach plug configured to plug the drill casing below a zone so as to enable a rinse solution to be introduced into the zone after stimulation and a leach period.

24. The system as recited in claim 23, wherein the releach plug includes a mechanical swivel configured to enable the releach plug to continue diverting solution through the drill casing despite any spinning action that may be induced in the drill casing by introduction of the rinse solution.

25. The system as recited in claim 23, wherein the downwell section includes a cable suspension system configured to hold at least the releach plug, the suspension system, and the rinse solution at a depth of the zone to be rinsed.

26. The system as recited in claim 25, wherein the cable suspension system includes one or more cable clamps fastened to a cable of the cable suspension system at one or more locations on the cable to suspend the releach plug below the zone.

27. The system as recited in claim 26, wherein the cable suspension system includes one or more depth markers attached to each of the one or more cable clamps.

28. The system as recited in claim 25, wherein the tree section includes a slotted plate configured to pass the cable into the well head and a cable clamp configured to suspend the cable from the tree section.

29. The system as recited in claim 23, wherein the system is configured to enable introduction of a falling column of the rinse solution to the drill pipe at the well head to result in rapid evacuation of the zone with rinse solution.

30. A system for recovery of a target material from a collection of materials over a collection pad through a leaching process, comprising:
a manifold configured to transport a barren solution for treatment of a zone within the collection containing the target material;
a mobile platform configured to receive the barren solution from the manifold and pump the barren solution into a tree section configured to be connected to the mobile platform and connected to a well head of a well drilled into the collection above the zone; and
a downwell section configured to be installed into the well from the well head including a drill casing having one or more perforated sections, a drill pipe having a perforated pipe section configured to be inserted into the drill casing and to position the perforated pipe section relative to one of the perforated sections, and an isolation mechanism configured to seal the drill casing above and below the perforated section so as isolate the flow of barren solution pumped into the tree section, through the well head, down the drill pipe, through the perforated section and through the perforated casing section into the zone so as to lift and mobilize some of the materials within the zone of the collection so as to create a plurality of substantially horizontal channels within the zone through which the barren solution flows to change the chemistry of the materials and/or dissolve the target material for collection from the collection pad.

* * * * *